United States Patent
Endo et al.

(10) Patent No.: US 12,090,446 B2
(45) Date of Patent: Sep. 17, 2024

(54) SEMIPERMEABLE COMPOSITE MEMBRANE, METHOD OF PRODUCING SAME, AND SEMIPERMEABLE COMPOSITE MEMBRANE ELEMENT

(71) Applicants: SHINSHU UNIVERSITY, Matsumoto (JP); LIXIL CORPORATION, Tokyo (JP)

(72) Inventors: Morinobu Endo, Nagano (JP); Toru Noguchi, Nagano (JP); Hiroyuki Yamada, Otsu (JP)

(73) Assignees: SHINSHU UNIVERSITY, Nagano (JP); LIXIL CORPORATION, Tokyo (JP)

( * ) Notice: Subject to any disclaimer, the term of this patent is extended or adjusted under 35 U.S.C. 154(b) by 967 days.

(21) Appl. No.: 17/053,280

(22) PCT Filed: Jun. 3, 2019

(86) PCT No.: PCT/JP2019/022036
§ 371 (c)(1),
(2) Date: Nov. 5, 2020

(87) PCT Pub. No.: WO2019/235441
PCT Pub. Date: Dec. 12, 2019

(65) Prior Publication Data
US 2021/0283556 A1     Sep. 16, 2021

(30) Foreign Application Priority Data
Jun. 4, 2018 (JP) .................................. 2018-106719

(51) Int. Cl.
*B01D 69/12* (2006.01)
*B01D 61/02* (2006.01)
(Continued)

(52) U.S. Cl.
CPC ....... *B01D 69/1251* (2022.08); *B01D 61/025* (2013.01); *B01D 61/026* (2022.08);
(Continued)

(58) Field of Classification Search
CPC .. B01D 69/125; B01D 61/025; B01D 61/026; B01D 67/0006; B01D 69/02;
(Continued)

(56) References Cited

U.S. PATENT DOCUMENTS

| 5,032,281 A | 7/1991 | Nagamatsu et al. |
| 5,136,032 A | 8/1992 | Nagamatsu et al. |

(Continued)

FOREIGN PATENT DOCUMENTS

| CN | 101264427 A | 9/2008 |
| CN | 104028118 A | 9/2014 |

(Continued)

OTHER PUBLICATIONS

Wang (Nanofiltration membranes based on thin-film nanofibrous composites, Journal of Membrane Science, 2014, and 469 and pp. 188-197 (Year: 2014).*

(Continued)

*Primary Examiner* — Waqaas Ali
(74) *Attorney, Agent, or Firm* — Oliff PLC

(57) ABSTRACT

A semipermeable composite membrane that reduces an environmental load, and a method of producing the semipermeable composite membrane. A semipermeable composite membrane includes, on a porous support, a semipermeable membrane containing a crosslinked polyamide and a cellulose nanofiber. A method of producing the semipermeable composite membrane includes obtaining a mixed solution containing the cellulose nanofiber, water, and an amine component, and obtaining the semipermeable composite membrane by making the mixed solution be in contact with (Continued)

the porous support, thereafter, causing a cross-linking reaction of the amine component in the mixed solution, with the amine component adhering to the porous support.

7 Claims, 6 Drawing Sheets

(51) Int. Cl.
| | |
|---|---|
| *B01D 63/10* | (2006.01) |
| *B01D 67/00* | (2006.01) |
| *B01D 69/02* | (2006.01) |
| *B01D 69/10* | (2006.01) |
| *B01D 71/10* | (2006.01) |
| *B01D 71/56* | (2006.01) |
| *B32B 27/06* | (2006.01) |
| *B32B 27/28* | (2006.01) |
| *C02F 1/44* | (2023.01) |
| *C02F 103/08* | (2006.01) |

(52) U.S. Cl.
CPC ....... *B01D 63/107* (2022.08); *B01D 67/0006* (2013.01); *B01D 69/02* (2013.01); *B01D 69/10* (2013.01); *B01D 69/125* (2013.01); *B01D 71/10* (2013.01); *B01D 71/56* (2013.01); *B32B 27/06* (2013.01); *B32B 27/286* (2013.01); *C02F 1/441* (2013.01); *B01D 63/10* (2013.01); *B01D 2313/12* (2013.01); *B01D 2319/04* (2013.01); *B01D 2323/30* (2013.01); *B01D 2325/20* (2013.01); *B32B 2255/10* (2013.01); *B32B 2255/26* (2013.01); *B32B 2262/062* (2013.01); *B32B 2307/726* (2013.01); *C02F 2103/08* (2013.01); *C02F 2303/20* (2013.01)

(58) Field of Classification Search
CPC ........ B01D 69/10; B01D 71/10; B01D 71/56; B01D 63/10; B01D 2313/12; B01D 2319/04; B01D 2323/30; B01D 2325/20; B01D 69/12; B32B 27/06; B32B 27/286; B32B 2255/10; B32B 2255/26; B32B 2262/062; B32B 2307/726; B32B 2262/0238; B32B 1/08; B32B 5/022; B32B 5/028; B32B 27/304; B32B 27/32; B32B 2262/0253; B32B 5/026; B32B 2255/02; B32B 2262/0246; B32B 2262/0261; B32B 2262/0276; B32B 2597/00; B32B 5/024; B32B 5/26; B32B 27/12; B32B 5/24; C02F 1/441; C02F 2103/08; C02F 2303/20; C02F 1/44; Y02A 20/131

See application file for complete search history.

(56) References Cited

U.S. PATENT DOCUMENTS

| | | | |
|---|---|---|---|
| 2016/0129401 | A1 | 5/2016 | Furuno et al. |
| 2017/0333835 | A1 | 11/2017 | Sano et al. |
| 2018/0043312 | A1 | 2/2018 | Endo et al. |
| 2019/0282962 | A1 | 9/2019 | Konda et al. |
| 2019/0321788 | A1 | 10/2019 | Endo et al. |
| 2020/0047131 | A1* | 2/2020 | Hsiao ................... B01D 61/025 |

FOREIGN PATENT DOCUMENTS

| | | | |
|---|---|---|---|
| CN | 105263608 A | 1/2016 | |
| CN | 105771694 A | 7/2016 | |
| CN | 107008166 A | 8/2017 | |
| JP | H03-068435 A | 3/1991 | |
| JP | 2005-169332 A | 6/2005 | |
| JP | 2011-208293 A | 10/2011 | |
| JP | 5120006 B2 | 1/2013 | |
| JP | 2016-145270 A | 8/2016 | |
| JP | 2018-051498 A | 4/2018 | |
| JP | 2018-169308 A | 11/2018 | |
| WO | 2016/136294 A1 | 9/2016 | |
| WO | 2016/158992 A1 | 10/2016 | |
| WO | WO-2018056090 A1 * | 3/2018 | ........... B01D 61/025 |

OTHER PUBLICATIONS

Nov. 15, 2022 Office Action issued in Japanese Patent Application No. 2020-523102.
Wang et al., "Nanofiltration membranes based on thin-film nanofibrous composites", Journal of Membrane Science 469, (2014), pp. 188-197.
Aug. 17, 2022 Office Action issued in Chinese Patent Application No. 201980037416.1.
Jan. 27, 2022 Office Action issued in Chinese Patent Application No. 201980037416.1.
Wang et al., "Nanofiltration membranes prepared by interfacial polymerization on thin-film nanofibrous composite scaffold," Polymer, 2014, vol. 55, pp. 1358-1366.
Aug. 20, 2019 International Search Report issued in International Patent Application No. PCT/JP2019/022036.

* cited by examiner

SEMIPERMEABLE COMPOSITE MEMBRANE, METHOD OF PRODUCING SAME, AND SEMIPERMEABLE COMPOSITE MEMBRANE ELEMENT

TECHNICAL FIELD

The present invention relates to a semipermeable composite membrane useful for selectively separating a liquid mixture, a method of producing the semipermeable composite membrane, and a semipermeable composite membrane element. For example, the semipermeable composite membrane obtained according to the invention can be preferably used for desalinating seawater and brackish water.

BACKGROUND ART

The separation membrane technology and the water treatment technology using a reverse osmosis membrane (RO membrane) and a nanofiltration membrane (NF membrane) which utilize properties of a semipermeable membrane are attracting attention for dealing with the global water shortage and water pollution. Among them, a reverse osmosis membrane using an aromatic polyamide and having a pore diameter of 1 nm or less, which makes it possible to remove even ion components such as salts, is widely used as a separation membrane of high permeability and a high salt removal performance in seawater desalination plants (PTL 1).

In contrast, a cellulose nanofiber that is obtained by fibrillating a natural cellulose fiber so as to have a nano-size has attracted attention in recent years. Natural cellulose fibers are biomass of which raw material is pulp of wood or the like. It is expected that effectively using the natural cellulose fibers will reduce the environmental load. A composite material using such a cellulose nanofiber that is expected to reduce the environmental load is proposed (PTL 2).

CITATION LIST

Patent Literature

PTL 1: JP-A-2005-169332
PTL 2: JP-A-2011-208293

SUMMARY OF INVENTION

Technical Problem

An object of the invention is to provide a semipermeable composite membrane that reduces the environmental load, a method of producing the semipermeable composite membrane, and a semipermeable composite membrane element.

Solution to Problem

As a result of intensive research to achieve the foregoing object, the inventors of the invention have found that the foregoing problem can be solved, and completed the invention. That is, the invention is as follows.

APPLICATION EXAMPLE 1

A semipermeable composite membrane according to the present application example includes: a porous support; and a semipermeable membrane formed on the porous support, the semipermeable membrane containing a crosslinked polyamide and a cellulose nanofiber.

APPLICATION EXAMPLE 2

In the semipermeable composite membrane according to the present application example, a content of the cellulose nanofiber in the semipermeable membrane may be 0.2 mass % to 18 mass %.

APPLICATION EXAMPLE 3

In the semipermeable composite membrane according to the present application example, a rate of lowering the water permeation flux thereof after contacting with an aqueous solution for 140 hours is lower than 20%, the aqueous solution containing bovine serum albumin having a concentration of 100 ppm.

APPLICATION EXAMPLE 4

In the semipermeable composite membrane according to the present application example, an arithmetical mean height (Sa) of a surface of the semipermeable membrane may be 10 nm to 37 nm, the arithmetical mean height being measured using an atomic force microscope conforming to ISO 25178.

APPLICATION EXAMPLE 5

In the semipermeable composite membrane according to the present application example, a mean fiber diameter of the cellulose nanofiber may be 3 nm to 200 nm.

APPLICATION EXAMPLE 6

In the semipermeable composite membrane according to the present application example, a water permeation flux thereof when a NaCl aqueous solution of pH 6 to 8 at 25° C. at 3.2% in concentration is fed at 5.5 MPa in operating pressure for 1 hour may be 0.9 $m^3/(m^2 \cdot day)$ or more, and the NaCl rejection rate thereof may be 99% more.

APPLICATION EXAMPLE 7

A method of producing a semipermeable composite membrane according to the present application example includes: obtaining a mixed solution containing a cellulose nanofiber, water, and an amine component; and obtaining a semipermeable composite membrane by making the mixed solution be in contact with a porous support, thereafter, causing a cross-linking reaction of the amine component in the mixed solution, with the amine component adhering to the porous support.

APPLICATION EXAMPLE 8

A semipermeable composite membrane element according to the present application example includes: at least two of the semipermeable composite membranes according to the foregoing application example, the semipermeable composite membranes being layered so that faces thereof on the semipermeable membrane sides face each other, and faces thereof on opposite sides to the semipermeable membrane sides face each other; a raw water side flow path member disposed between the faces of the semipermeable composite membranes on the semipermeable membrane sides, the raw water side flow path member having a thickness of 0.15 mm to 0.9 mm; a permeate side flow path member disposed between the faces of the semipermeable composite membranes on the opposite sides to the semipermeable membranes; and a perforated water collection tube allowing a permeate, which flows in a permeate side flow path formed of the permeate side flow path member, to be collected.

Advantageous Effects of Invention

The invention can provide a semipermeable composite membrane that leads to environmental load reduction, a method of producing the semipermeable composite membrane, and a semipermeable composite membrane element.

DESCRIPTION OF EMBODIMENTS

Hereinafter embodiments of the invention will be described in detail with reference to the drawings.

A. Semipermeable Composite Membrane

A semipermeable composite membrane according to one embodiment of the invention includes a porous support, and a semipermeable membrane disposed on the porous support, the semipermeable membrane containing a crosslinked polyamide and a cellulose nanofiber.

Figure 1:
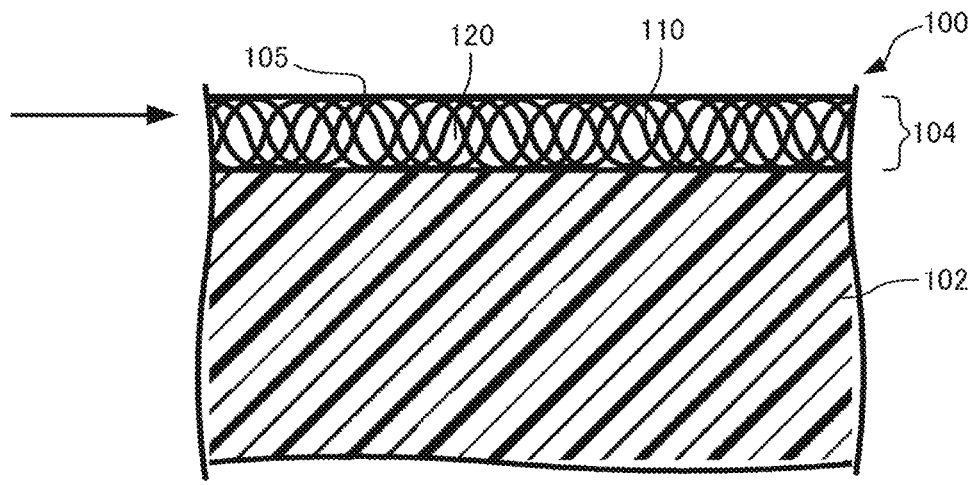
FIG. 1 is a longitudinal cross-sectional view schematically illustrating a semipermeable composite membrane 100.

FIG. 1 is a longitudinal cross-sectional view schematically illustrating a semipermeable composite membrane 100.

The semipermeable composite membrane 100 includes a porous support 102, and a semipermeable membrane 104 disposed thereon. At least one face of the porous support 102 is covered with the semipermeable membrane 104. The semipermeable membrane 104 contains a crosslinked polyamide 120 (hereinafter an example of a crosslinked aromatic polyamide will be described, but the crosslinked polyamide 120 is not limited thereto) and a cellulose nanofiber 110. The entire of a surface 105 of the semipermeable membrane 104 is covered with the crosslinked aromatic polyamide 120. The semipermeable composite membrane 100 containing the cellulose nanofiber 110 can reduce the environmental load.

The semipermeable membrane 104 contains the cellulose nanofiber 110 in the crosslinked aromatic polyamide 120. In the semipermeable membrane 104, adjacent gaps in the fibrillated cellulose nanofiber 110 are filled with the crosslinked aromatic polyamide 120 as a matrix. The presence of the cellulose nanofiber 110 can be detected by analyzing the semipermeable membrane 104 using a scanning transmission electron microscope (STEM).

In the invention, "cellulose nanofiber" is obtained by fibrillating a natural cellulose fiber and/or an oxidized cellulose fiber so as to have a size at a nanolevel, and particularly may be a cellulose microfibril and/or a cellulose microfibril bundle having a mean fiber diameter of 3 nm to 200 nm, which is further 3 nm to 150 nm, and particularly 3 nm to 100 nm. That is, the cellulose nanofiber 110 may include a single cellulose nanofiber only, or a bundle of a plurality of threads of a single cellulose nanofiber together. Here, in the present description, numeral ranges shown with the word "to" each encompass the upper limit and the lower limit.

The mean aspect ratio of the cellulose nanofiber 110 (fiber length/fiber diameter) may be 10 to 1000, further may be 10 to 500, and particularly may be 100 to 350.

The thickness of the semipermeable membrane 104 may be 10 nm to 200 nm, and further may be 10 nm to 150 nm. The semipermeable membrane 104 having a thickness of 10 nm or more can be reinforced by the cellulose nanofiber 110 having a fiber diameter smaller than the membrane thickness, for example, approximately 3 nm. The semipermeable membrane 104 having a thickness of 150 nm or less is presumed to offer a practical water permeation flux when used as a reverse osmosis membrane.

The semipermeable composite membrane 100 has excellent pressure resistance owing to the reinforcement effect of the cellulose nanofiber 110, and thus can be used even under a comparatively high operating pressure. The capability to raise operating pressure contributes to obtainment of a high water permeation flux when the semipermeable membrane 104 is used as a reverse osmosis membrane. It is also presumed that using the semipermeable membrane 104 containing the cellulose nanofiber 110 improves antifouling properties of the semipermeable composite membrane 100 compared to a composite membrane using a semipermeable membrane of a single aromatic polyamide. As described later, it is believed that a lower arithmetical mean height (Sa) of the surface 105 of the semipermeable membrane 104 improves antifouling properties. The semipermeable membrane 104 containing the cellulose nanofiber 110 lowers the arithmetical mean height (Sa) of the surface 105 of the semipermeable membrane 104. A lowered arithmetical mean height (Sa) makes organic foulants etc. easy to be released from the surface 105 of the semipermeable membrane 104, to recover the water permeation flux lowered by fouling.

The porous support 102 is provided in order to give the semipermeable membrane 104 dynamic strength. The porous support 102 does not necessarily show a separation performance substantially.

A known porous support for semipermeable composite membranes can be applied to the porous support 102. For example, the porous support described in Japanese Patent No. 5,120,006 can be employed.

The thickness of the porous support 102 may be 10 μm to 200 μm, and is further preferably 30 μm to 100 μm. he porous support 102 may have an asymmetric structure as long as keeping both a function of supporting the membrane, and permeability.

The porous support 102 has micropores from the surface to the back face thereof. The mean pore diameter of the porous support 102 on a side face where the semipermeable membrane 104 is formed may be 0.1 nm to 100 nm. Most pores on this side face may have a diameter of several tens nm or less. The porous support 102 may be reinforced by backing with a woven fabric, a nonwoven fabric, or the like.

The content of the cellulose nanofiber 110 in the semipermeable membrane 104 is preferably 0.2 mass % to 18 mass %, more preferably 0.3 mass % to 18 mass %, and further preferably 0.35 mass % to 18 mass %. The content of the cellulose nanofiber 110 of 0.2 mass % or more offers high permeability compared to a semipermeable membrane of a single aromatic polyamide. It can be presumed that the content of the cellulose nanofiber 110 of 0.2 mass % or more leads to a low arithmetical mean height (Sa) of the semipermeable membrane 104, which improves anti-organic fouling properties compared to a semipermeable membrane of a single aromatic polyamide. According to the experiments of the inventors of the invention, the content of the cellulose nanofiber 110 of 18 mass % or less leads to easy application of an aqueous dispersion liquid of the cellulose nanofiber, which makes it easy to produce the semipermeable composite membrane 100. The content of the cellulose nanofiber 110 in the semipermeable membrane 104 is obtained from a reaction formula of interfacial polymerization.

A way of obtaining the content of the cellulose nanofiber 110 will be described using the cross-linking reaction of m-phenylenediamine and trimesoyl chloride as an example. When a polyamide is formed by the cross-linking reaction caused by interfacial polymerization, two —NH$_2$ groups of m-phenylenediamine and three —COCl groups of trimesoyl chloride do not completely react but partially remain. But first, it is assumed that 3 mol (324.4 g) of m-phenylenediamine and 2 mol (530.9 g) of trimesoyl chloride are polymerized to form a polyamide (636.7 g) as the following reaction formula (1).

$$3(C_6H_4(NH_2)_2) + 2(C_9H_3Cl_3O_3) \rightarrow C_{36}H_{18}O_6(NH)_6 + 6HCl \quad (1)$$

The content of the cellulose nanofiber 110 (CNF content (mass %)) in the semipermeable membrane 104 can be calculated from the following formula (1). Mass of a formed polyamide is obtained from the foregoing reaction formula (1) and the composition of an aqueous solution containing m-phenylenediamine and the cellulose nanofiber, and next, mass of unreacted m-phenylenediamine in the interfacial polymerization of m-phenylenediamine and trimesoyl chloride is obtained, which make it possible to calculate mass of an actually formed polyamide (Ma). Mass of this unreacted m-phenylenediamine is measured by the experiment described later, to estimate mass of the formed polyamide, which makes it possible to determine the content (mass %) of the cellulose nanofiber. The CNF content can be also determined by applying any combination other than the combination of m-phenylenediamine and trimesoyl chloride to the reaction formula thereof, to estimate mass etc. in the same manner.

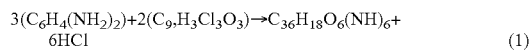

$$CNF \text{ content (mass \%)} = \text{mass } e/(\text{mass } h + \text{mass } e) \times 100 \quad (1)$$

where CNF content represents the content of the cellulose nanofiber, mass e represents mass of the cellulose nanofiber, and mass h represents mass of the actually formed polyamide.

The semipermeable composite membrane 100 containing the cellulose nanofiber 110 in the crosslinked aromatic polyamide 120 can have excellent salt rejection rate, an excellent water permeation flux, and further excellent anti-organic fouling properties. The semipermeable composite membrane 100 can have a water permeation flux of 0.9 m$^3$/(m$^2$·day) or more and a NaCl rejection rate of 99% or more when a 3.2% NaCl aqueous solution of pH 6 to 8 at 25° C. is fed at 5.5 MPa in operating pressure for 1 hour.

The water permeation flux of the semipermeable composite membrane 100 was measured as follows. That is, a test cell of the semipermeable composite membrane having a diameter of 25 mm (effective area: 3.46 cm$^2$) was installed in a membrane test unit, and pure water was fed at 5.5 MPa in operating pressure at 300 mL/min in flow rate for 3 hours to stabilize the water permeation flux; and the water permeation flux was measured by feeding a 3.2 mass % sodium chloride aqueous solution at 25° C. by the cross flow filtration method at 5.5 MPa in operating pressure at 300 mL/min in flow rate.

Anti-organic fouling properties can be measured using a commercially available membrane test unit. For example, a desktop flat membrane test unit FTU-1 from Membrane Soltech can be used as a membrane test unit. A test cell of the semipermeable composite membrane having a diameter of 25 mm (effective area: 3.46 cm$^2$) is installed in a membrane test unit, a 10 mmol sodium chloride aqueous solution at 23° C. is fed to the semipermeable composite membrane by the cross flow filtration method at 0.7 MPa in operating pressure at 500 mL/min in flow rate for 3 days or more. Generally, the water permeation flux of a semipermeable composite membrane lowers when an aqueous solution is fed, and is stabilized after 3 days have passed. The water permeation flux when stabilized, specifically when the aqueous solution is fed until the rate of change in the water permeation flux is kept within +5% for 6 hours is defined as the initial water permeation flux because time until the water permeation flux is stabilized varies according to samples. The cross flow filtration method is a method of filtering an aqueous solution as the aqueous solution is passed in parallel to the surface of a semipermeable membrane.

The semipermeable composite membrane 100 has excellent anti-organic fouling properties. The rate of lowering the water permeation flux of the semipermeable composite membrane 100 after the semipermeable composite membrane 100 is in contact with a 100 ppm bovine serum albumin aqueous solution for 140 hours may be lower than 20%. The recovery of the water permeation flux of the semipermeable composite membrane 100 reduces lowering of the water permeation flux due to fouling. As described above, it is presumed that reducing surface roughness of the semipermeable membrane 104 to improve smoothness of the surface of the membrane makes it possible to achieve improvement in anti-organic fouling properties. This reduces adhesion of dirt to the semipermeable membrane 104, and makes it easy for dirt to be released as time passes, which make it possible to recover the water permeation flux, which was lowered due to fouling of the semipermeable membrane 104. A scene where foulants are released can be observed by observing the state of the semipermeable membrane 104 as the water permeation flux is measured by means of a microscope, using fluorescent dye-treated foulants. The content of the cellulose nanofiber 110 in the semipermeable membrane 104 of 0.2 mass % or more offers excellent anti-organic fouling properties as the performance of the membrane is not deteriorated compared to a membrane of a single aromatic polyamide which does not contain the cellulose nanofiber 110.

Anti-organic fouling properties can be evaluated by obtaining the initial water permeation flux, and feeding water to be treated of pH 7.5 which is obtained by putting 100 ppm bovine serum albumin (BSA) into the sodium chloride aqueous solution same as that used for the measurement of the initial water permeation flux, at 23° C. at 0.7 MPa in operating pressure at 500 mL/min in flow rate for 140 hours or more. The rate of lowering the water permeation flux of the semipermeable composite membrane 100 during this time may be lower than 20% of the initial water permeation flux.

The arithmetical mean height (Sa) of the surface 105 of the semipermeable membrane 104 in the semipermeable composite membrane 100 may be 10 nm to 50 nm, and further may be 10 nm to 41 nm. The surface 105 is a face of the semipermeable membrane 104 on the side opposite to the porous support 102. Particularly, the arithmetical mean height (Sa) of the surface 105 of the semipermeable membrane 104 according to the same measurement method may be 10 nm to 37 nm, and further may be 10 nm to 26 nm. The surface 105 of the semipermeable membrane 104 having a lower arithmetical mean height (Sa) makes it easy for organic foulants and the like to be released from the surface of the membrane, to recover the water permeation flux lowered due to fouling. The surface 105 of the semipermeable membrane 104 having an arithmetical mean height (Sa) of 50 nm or less, further 41 nm or less, and particularly 37 nm or less offers excellent anti-organic fouling properties. The semipermeable membrane 104 having an arithmetical mean height (Sa) of 10 nm or more can be produced by incorporating a predetermined amount or more of the cellulose nanofiber 110. The arithmetical mean height (Sa) of the semipermeable membrane 104 containing the cellulose nanofiber 110 represents smoothness such that antifouling properties are affected.

The arithmetical mean height (Sa) can be measured using an atomic force microscope (AFM). Arithmetical mean height (Sa) is a kind of 3D surface texture parameters (surface roughness parameters) in international standards (ISO 25178), and is a parameter obtained by expanding arithmetic mean roughness Ra that is a parameter of roughness (two dimensions) to three dimensions. Arithmetic mean roughness Ra conforms to JIS B 0601-2013.

Examples of solutions to be separated by the semipermeable composite membrane 100 include high salinity brackish water, seawater and concentrated seawater.

For example, the semipermeable composite membrane can be used by being incorporated into a spiral, tubular, or plate and frame element, or, in the case of a hollow fiber, by being tied up in a bundle to be incorporated into an element.

The recovery of the water permeation flux of the semipermeable composite membrane 100 which is lowered due to fouling, will be described later.

B. Raw Materials

First, raw materials used in a method of producing the semipermeable composite membrane will be each described.

B-1. Cellulose Nanofiber

The cellulose nanofiber is obtained by fibrillating a natural cellulose fiber and/or an oxidized cellulose fiber so as to have a size at a nanolevel, and particularly may be a cellulose microfibril and/or a cellulose microfibril bundle having a mean fiber diameter of 3 nm to 200 nm, which is further 3 nm to 150 nm, and particularly 3 nm to 100 nm. That is, the cellulose nanofiber may include a single cellulose nanofiber only, or a bundle of a plurality of threads of a single cellulose nanofiber together.

The mean aspect ratio of the cellulose nanofiber (fiber length/fiber diameter) may be 10 to 1000, further may be 10 to 500, and particularly may be 100 to 350.

The cellulose nanofiber is offered as a cellulose nanofiber aqueous dispersion liquid. The aqueous dispersion liquid may contain an oxidized cellulose fiber. Since the cellulose nanofiber is biomass whose raw material is pulp of wood or the like, it is expected that effectively using the cellulose nanofiber will reduce the environmental load.

B-2. Method of Producing Cellulose Nanofiber Aqueous Dispersion Liquid

The aqueous dispersion liquid containing the cellulose nanofiber can be obtained according to a production method including, for example, an oxidation step of oxidizing a natural cellulose fiber to obtain an oxidized cellulose fiber, and a miniaturization step of miniaturizing the oxidized cellulose fiber. The aqueous dispersion liquid containing an oxidized cellulose fiber can be produced by, for example, an oxidation step of oxidizing a natural cellulose fiber to obtain an oxidized cellulose fiber.

First, in the oxidation step, a slurry containing water, and a natural cellulose fiber dispersed in the water is prepared by adding water to the natural cellulose fiber that is a raw material, and processing the resultant by means of a mixer or the like. Here, examples of the natural cellulose fiber include wood pulp, cotton-based pulp, and bacterial cellulose. More specifically, examples of wood pulp include pulp of conifer and pulp of broadleaf trees, examples of cotton-based pulp include cotton linter and cotton lint, and examples of non-wood pulp include straw pulp and bagasse pulp. One or more of them can be used as the natural cellulose fiber.

The natural cellulose fiber has a structure constituted of a cellulose microfibril bundle, and lignin and a hemicellulose with which gaps in the cellulose microfibril bundle is filled. That is, it is presumed that the natural cellulose fiber has a structure such that a cellulose microfibril and/or the cellulose microfibril bundle is covered with the hemicellulose, and the covered microfibril and/or bundle is further covered with lignin. The gaps in the cellulose microfibril and/or the cellulose microfibril bundle is strongly bonded by lignin to form a plant fiber. Therefore, it is preferable to remove lignin from the plant fiber in advance from such a view point that a cellulose fiber in the plant fiber can be prevented from aggregating. The lignin content in the plant fiber-containing material is normally approximately 40 mass % or less, and preferably approximately 10 mass % or less. The lower limit of the lignin removal ratio is not particularly limited, but the closer to 0 mass % the lignin removal ratio is, the more preferable. The lignin content can be measured using the Klason method.

A cellulose microfibril having a fiber diameter of approximately 3 to 4 nm exists as the minimum unit of cellulose microfibrils. This can be referred to as "single cellulose nanofiber".

Next, as the oxidation step, an oxidized cellulose fiber is obtained by oxidizing the natural cellulose fiber in water using an N-oxyl compound as an oxidizing catalyst. For example, as N-oxyl compounds that can be used as an oxidizing catalyst for celluloses, 2,2,6,6-tetramethyl-1-piperidine-N-oxyl (hereinafter may be also referred to as "TEMPO"), 4-acetamide-TEMPO, 4-carboxy-TEMPO, and 4-phosphonooxy-TEMPO can be used.

A purification step of, for example, repeating washing by water and filtration is performed after the oxidation step, which makes it possible to remove impurities other than the oxidized cellulose fiber which are contained in the slurry, such as an unreacted oxidizing agent and various by-products. A solvent containing the oxidized cellulose fiber is, for example, in a state where the oxidized cellulose fiber is impregnated with water. In this stage, the oxidized cellulose fiber is not fibrillated to be in a unit of a cellulose nanofiber. As the solvent, water can be used, and for example, a water-soluble organic solvent other than water (such as alcohols, ethers and ketones) can be also used according to the object.

A part of hydroxyl groups of the cellulose nanofiber is modified with (a) substituent(s) each having a carboxyl group, so that the oxidized cellulose fiber has a carboxyl group.

The mean fiber diameter of the oxidized cellulose fiber may be 10 μm to 30 μm. The mean fiber diameter of the oxidized cellulose fiber is the arithmetic mean value obtained through measurement of 50 or more threads of the oxidized cellulose fiber within a field of view of an electron microscope.

The oxidized cellulose fiber may be a cellulose microfibril bundle. The oxidized cellulose fiber is not necessary to be fibrillated to be in a unit of a cellulose nanofiber in a mixing step and a drying step described later. The oxidized cellulose fiber can be fibrillated to be the cellulose nanofiber in the miniaturization step.

In the miniaturization step, the oxidized cellulose fiber may be stirred in the solvent such as water, which can offer the cellulose nanofiber.

In the miniaturization step, the solvent as a dispersion medium may be water. (A) water-soluble organic solvent(s) such as alcohols, ethers and ketones can be also used as the solvent other than water alone or in combination.

For the stirring in the miniaturization step, a disintegrator, a beater, a low-pressure homogenizer, a high-pressure homogenizer, a grinder, a cutter mill, a ball mill, a jet mill, a single-screw extruder, a twin-screw extruder, an ultrasonic stirrer, a domestic juicer mixer, etc. can be used.

In the miniaturization step, the solid content of the solvent containing the oxidized cellulose fiber may be, for example, 50 mass % or less. The solid content of 50 mass % or less makes it possible to realize dispersion at a low energy level.

The aqueous dispersion liquid containing the cellulose nanofiber can be obtained by the miniaturization step. The aqueous dispersion liquid containing the cellulose nanofiber may be either a colorless transparent suspension or a translucent suspension. The suspension contains the cellulose nanofiber that is a surface-oxidized, and fibrillated and miniaturized fiber dispersed in water. That is, in this aqueous dispersion liquid, the cellulose nanofiber is obtained by reducing strong cohesive force among the microfibril (hydrogen bonds between surfaces) by introduction of carboxyl groups in the oxidation step, and further undergoing the miniaturization step. The carboxyl group content, the polarity, the mean fiber diameter, the mean fiber length, the mean aspect ratio, etc. can be controlled by adjusting conditions for the oxidation step.

The aqueous dispersion liquid obtained as described above can contain the cellulose nanofiber in an amount of 0.1 mass % to 10 mass %. For example, the aqueous dispersion liquid can be a diluted aqueous dispersion liquid having a 1 mass % cellulose nanofiber solid content. Further, the light transmittance of the aqueous dispersion liquid may be 40% or more, further 60% or more, and particularly 80% or more. The transmittance of the aqueous dispersion liquid can be measured using a UV spectrophotometer as a transmittance at 660 nm in wavelength.

B-3. Polyamide

The polyamide may be an aromatic polyamide. The polyamide in the semipermeable membrane is cross-linked.

The aromatic polyamide includes an aromatic amine component. The aromatic polyamide may be an all aromatic polyamide. As the aromatic amine, at least one aromatic multifunctional amine selected from the group consisting of m-phenylenediamine, p-phenylenediamine, 1,3,5-triaminobenzene, 1,2,4-triaminobenzene, 3,5-diaminobenzoic acid, 2,4-diaminotoluene, 2,4-diaminoanisole, amidol, xylylenediamine, N-methyl-m-phenylenediamine, and N-methyl-p-phenylenediamine is preferable. One of them may be used alone, or two or more of them may be used in combination.

The cross-linked aromatic polyamide can have a functional group selected from the group consisting of $COO^-$, $NH_4^+$, and COOH.

B-4. Porous Support

As the porous support 102, polysulfones, polyethersulfones, cellulose acetate, polyvinyl chloride, polyacrylonitrile, polyphenylenesulfide, and phenylene sulfide sulfone can be used. Since being chemically, mechanically, and thermally stable, polysulfones are preferable for the porous support 102.

C. Method of Producing Semipermeable Composite Membrane

Next, the method of producing the semipermeable composite membrane will be described. The method of producing the semipermeable composite membrane according to one embodiment of the invention includes the steps of obtaining a mixed solution containing the cellulose nanofiber, water, and an amine component, and obtaining the semipermeable composite membrane by making the mixed solution be in contact with the porous support, thereafter to cause a cross-linking reaction of the amine component in the mixed solution which adheres to the porous support.

C-1. Step of Obtaining Mixed Solution

For example, the step of obtaining a mixed solution may include a step of mixing a first aqueous solution containing the amine component, and the aqueous dispersion liquid containing the fibrillated cellulose nanofiber, to obtain a second aqueous solution containing the amine component and the cellulose nanofiber. The first aqueous solution contains water and the amine component. As the amine component, at least one of the aromatic amines as the foregoing description B-2 can be selected. A solvent used for the first aqueous solution is preferably water. The aqueous dispersion liquid contains water and the cellulose nanofiber as the foregoing description B-1. The second aqueous solution is obtained by mixing the first aqueous solution and the aqueous dispersion liquid. A known method can be used as a method of mixing them. For example, a magnetic stirrer, an ultrasonic stirrer, etc. can be used.

The concentration of the aromatic amine component in the second aqueous solution may be 0.5 mass % to 5.0 mass %, and the concentration of the cellulose nanofiber 110 therein may be 0.01 mass % to 0.6 mass %. The aromatic amine in the second aqueous solution in an amount of 0.5 mass % or more can lead to formation of a composite membrane active layer having a thickness and crosslinking density necessary as a semipermeable membrane, to realize preferred salt rejection rate and permeability, which is preferable. This aromatic amine in an amount of 5.0 mass % or less leads to a low possibility of dissolving in a membrane permeate since there is few amount of an unreacted residue amine in the semipermeable membrane, and thus this range is preferable. The cellulose nanofiber in the second aqueous solution in an amount of lower than 0.01 mass % makes it difficult to offer an improved water permeation flux, and that in an amount of higher than 0.6 mass % makes processing using the aqueous dispersion liquid difficult. Thus, the foregoing range is preferable.

C-2. Step of Obtaining Semipermeable Composite Membrane

In the step of obtaining the semipermeable composite membrane 100, the second aqueous solution obtained as the foregoing is made to be in contact with the porous support 102, thereafter, causing a cross-linking reaction of the aromatic amine in the second aqueous solution which adheres to the porous support 102.

The second aqueous solution is applied to the porous support 102, and dried. Thereafter a solution containing a crosslinking agent is further applied onto the second aqueous solution to cause a polycondensation reaction and cross-linking, dried at room temperature, and thereafter washed by distilled water, to form the semipermeable membrane 104. The semipermeable composite membrane 100 described in the foregoing "A. Semipermeable composite membrane" can be made as described above.

A bar coater can be used in the step of applying the second aqueous solution to the porous support 102, to achieve uniform application. Unlimitedly to a bar coater, any known device may be employed as long as uniform application can be achieved.

For example, as the crosslinking agent, any organic solvent solution containing an acid chloride component, such as trimesoyl chloride, terephthalic acid chloride, isophthaloyl chloride, and biphenyl dicarboxylic acid chloride can be used. Other than the crosslinking agent, a basic catalyst for scavenging hydrochloric acid that is by-produced in the interfacial polymerization is contained. Examples of this basic catalyst include triethylamine and pyridine.

D. Use

Examples of the use of the semipermeable composite membrane include desalination processes for seawater and brackish water. Examples of the use of the semipermeable composite membrane also include processes for food industrial wastewater and industrially processed wastewater, and RO pretreatment for activated sludge treated water since the semipermeable membrane has excellent contamination resistance.

The semipermeable composite membrane may be incorporated in a semipermeable composite membrane element. For example, the semipermeable composite membrane element includes at least two of the semipermeable composite membranes layered so that faces thereof on the semipermeable membrane sides (surfaces of the semipermeable membranes) face each other, and faces thereof on opposite sides to the semipermeable membrane sides face each other, a raw water side flow path member that is disposed between the faces on the semipermeable membrane sides, a permeate side flow path member that is disposed between the faces on the opposite sides to the semipermeable membranes, and a perforated water collection tube that allows a permeate flowing in a permeate side flow path formed of the permeate side flow path member to be collected. In short, the semipermeable composite membrane element includes the semipermeable composite membrane, the raw water side flow path member, the semipermeable composite membrane, the permeate side flow path member, and the semipermeable composite membrane which are all layered in the order mentioned.

Functions of the semipermeable composite membrane element will be described. While raw water flows through a raw water side flow path that is formed of the raw water side flow path member between the semipermeable composite membranes, part of the raw water permeates the semipermeable composite membrane. The permeate obtained as described above has a lower solute concentration than the raw water. In contrast, a solute in water flowing the raw water side flow path is concentrated.

D-1. Raw Water Side Flow Path Member

The raw water side flow path member is arranged so as to be held between faces on the feeding sides of the semipermeable membranes, and forms a flow path through which the raw water is fed to the semipermeable composite membranes (that is, the raw water side flow path). The raw water side flow path member preferably has a shape so as to, for example, disturb the flow of a fluid on the raw water side in order to reduce the concentration polarization in the raw water side flow path. The raw water side flow path member may be a member having a continuous shape such that a convex shape is formed on a film, a net, or a sheet having voids. The material of the raw water side flow path member is not particularly limited.

When the raw water side flow path member is a net, the net is made of a plurality of threads. A plurality of the threads cross each other at points of intersection, and the net has a largest thickness at the point of intersection. The material of the threads, of which the net is made, is not particularly limited as long as keeping rigidity as the raw water side flow path member, and as long as not damage the surface of the semipermeable composite membrane. Polyethylene, polypropylene, polylactic acid, an ethylene vinyl acetate copolymer, polyester, polyurethane, a thermosetting elastomer, or the like is preferably used.

The thicker the raw water side flow path member is, the more preferable for preventing foulants from clogging the raw water side flow path, and for reducing the resistance in the raw water side flow path. In contrast, the semipermeable composite membrane of the invention is expected to reduce clogging in the raw water side flow path since being excellent for fouling.

Thus, even a thin raw water side flow path member can keep the yield of the semipermeable composite membrane element at a high level. The thinner the raw water side flow path member is, the more the amount of the semipermeable composite membrane which can be loaded into the semipermeable composite membrane element can be increased. Thus, the thickness of the raw water side flow path member is preferably 0.15 mm to 0.9 mm, and further preferably 0.28 mm to 0.8 mm.

D-2. Permeate Side Flow Path Member

The permeate side flow path member is arranged so as to be held between faces on the sides opposite to the semipermeable membranes, for example, faces of the porous supports, and forms a permeate side flow path through which a permeate permeating the semipermeable composite membrane flows. As the form of the permeate side flow path member, a knitting and a textile, a porous film and a nonwoven fabric, a net, etc. can be used. Especially in the case of a nonwoven fabric, a space formed of a fiber constituting the nonwoven fabric which is to be the flow path becomes large, which makes it easy for water to flow therein, and as a result, to improve the performance of the semipermeable composite membrane element, which is preferable.

The material of the permeate side flow path member is not particularly limited as long as chemical resistance etc. are considered, the shape as the permeate side flow path member is kept, and the amount of the component(s) dissolving in the permeate is small. Examples thereof include polyamide-based synthetic resins such as nylon, polyester-based and polyacrylonitrile-based synthetic resins, polyolefin-based synthetic resins such as polyethylene and polypropylene, and polyvinyl chloride-based, polyvinylidene chloride-based, and polyfluoroethylene-based synthetic resins.

D-3. Perforated Water Collection Tube

The perforated water collection tube has only to be made so that the permeate flows therethrough. The material and shape thereof are not particularly limited, and polyethylene, polypropylene, polyvinyl chloride, or the like is used.

As the perforated water collection tube, for example, a cylindrical member having a side face with which a plurality of pores are provided is used. A plurality of pores are arranged facing the permeate side flow path, and introduce the permeate from the permeate side flow path into the perforated water collection tube.

The semipermeable composite membranes, and the raw water side flow path member and the permeate side flow path member may be wound around the circumference of the perforated water collection tube. A semipermeable composite membrane element of such a structure is referred to as the spiral-type. The spiral-type element preferably has a raw water feeding part or a concentrate discharge part on an outside end portion in the winding direction.

D-4. Semipermeable Composite Membrane Element

Figure 11:
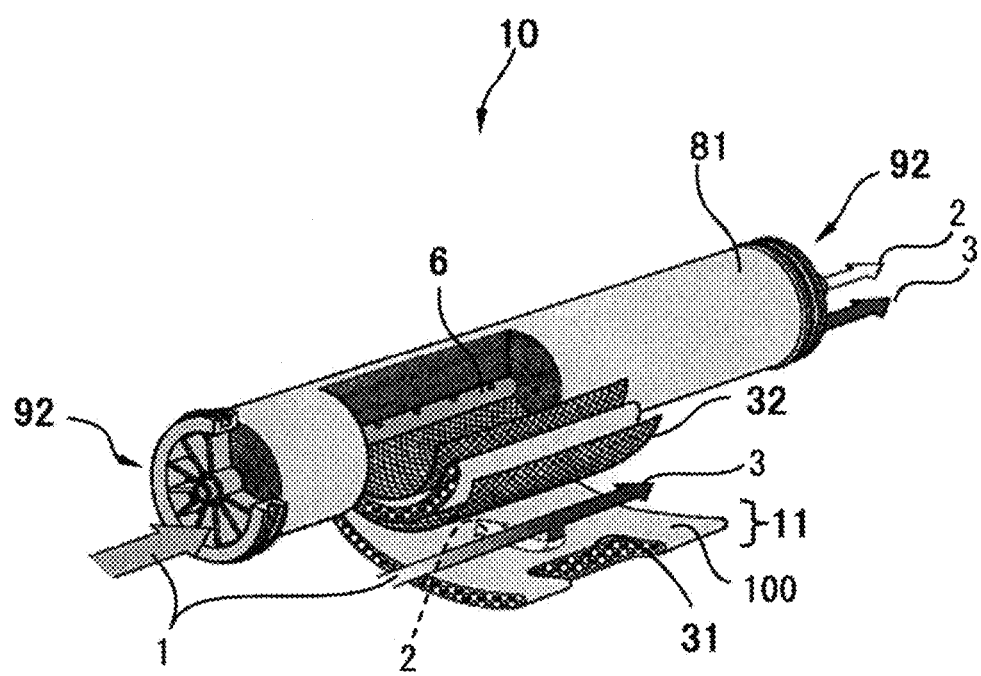
FIG. 11 is a partially exploded perspective view of a semipermeable composite membrane element according to one embodiment.

As a specific embodiment, FIG. 11 illustrates a spiral-type element 10 that is one embodiment of the semipermeable composite membrane element. FIG. 11 is a partially exploded perspective view of the spiral-type element 10. The spiral-type element 10 includes a perforated water collection tube 6, and a plurality of the semipermeable composite membranes 100 wound around the perforated water collection tube 6.

In addition to the foregoing structure, the spiral-type element 10 further has the following structure.

That is, the spiral-type element 10 includes a perforated end plate 92 at each of both ends thereof (that is, first end and second end). In the spiral-type element 10, an outer casing 81 is wound around the outer circumferential face of the wound semipermeable composite membrane 100.

The semipermeable composite membrane 100 forms an envelope membrane 11. A permeate side flow path member 31 is arranged on an inner side of the envelope membrane 11. A feeding side flow path member 32 is arranged between gaps in the envelope membrane 11.

Next, water treatment using the spiral-type element 10 will be described. Raw water 1 fed from the first end of the spiral-type element 10 passes through pores of the perforated end plate 92, to flow into the feeding side flow path. Then, the raw water 1 in contact with the faces of the semipermeable composite membranes 100, which are on the feeding side, is separated into a permeate 2 and a concentrate 3 by the semipermeable composite membranes 100.

The permeate 2 passes through the permeate side flow path, to flow into the perforated water collection tube 6. The permeate 2 having passed through the perforated water collection tube 6 flows out of the spiral-type element 10 through the second end of the spiral-type element 10.

The concentrate 3 passes through the feeding side flow path, to flow out of the spiral-type element 10 through pores of the perforated end plate 92 provided with the second end.

Part of the structure of the invention may be omitted, and each embodiment and/or variation thereof may be combined as long as the features and effects in the present application are obtained.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

EXAMPLES

Hereinafter examples of the invention will be described. The invention is not limited to the examples though.

(1) Making Sample According to Example 1 (0.35 Mass % CNF)

(1-1) Making Porous Support

A porous support of polysulfone was produced by fixing a wet nonwoven fabric as follows onto a glass plate, and casting a 15 wt % polysulfone solution containing a dimethylformamide (DMF) solvent (20° C.) thereon so that the total thickness was 210 µm to 215 µm, and immediately immersing the resultant in water. The wet nonwoven fabric was formed of combined filament yarn of a polyester fiber having a single yarn fineness of 0.5 dtex and a polyester fiber having a single yarn fineness of 1.5 dtex, having a size of 30 cm in length and 20 cm in width, and having permeability of 0.7 cm$^3$/cm$^2$ see and a mean pore diameter of 7 µm or less.

(1-2) Making Second Aqueous Solution

A first aqueous solution was obtained by adding 50 g of distilled water to 6 g of m-phenylenediamine, and stirring and mixing the resultant using a magnetic stirrer. A second aqueous solution was obtained by stirring and mixing the obtained first aqueous solution and 5 g of an aqueous dispersion liquid having a concentration of a cellulose nanofiber of 0.6 mass % using a magnetic stirrer, adding an additive (0.45 g of SLS (sodium lauryl sulfate), 12 g of CSA (camphorsulfonic acid), 6 g of TEA (triethylamine) and 18 g of IPA (isopropyl alcohol)) dissolved in 20 g of distilled water, adding distilled water so that the total amount was 300 g, and stirring the resultant using a magnetic stirrer. The second aqueous solution contained 2.0 mass % m-phenylenediamine, a 0.01 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

(1-3) Making Semipermeable Composite Membrane

The second aqueous solution was applied to a surface of the porous support of 80 cm$^2$ using a bar coater (#6 wired bar) at a speed of 10 mm/s, thereafter excessive part of the aqueous solution was removed from the surface of the porous support using a rubber blade, and thereafter 2 m$^1$ of an IP solvent solution containing 0.18 mass % trimesoyl chloride at room temperature was applied so that the surface of the membrane was completely wet. A semipermeable composite membrane according to each of Examples 1 to 9 was obtained by holding the membrane so that faces of the membrane were vertical for removing excessive part of the solution from the membrane to drain liquid, thereafter drying up the resultant in a thermostatic bath at 120° C. for 3 minutes, and thereafter immersing the resultant in distilled water to wash the resultant by the distilled water.

(1-4) Estimating Content of Cellulose Nanofiber

The content of the cellulose nanofiber in the semipermeable membrane was estimated from the following reaction formula (1) and an experiment in obtainment of the amount of unreacted m-phenylenediamine.

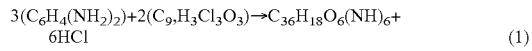
(1)

The foregoing reaction formula (1) represents that 3 mol of m-phenylenediamine (324.4 g) and 2 mol of trimesoyl chloride (530.9 g) are polymerized, to form a polyamide (636.7 g), where 1 g of the polyamide is formed from 0.51 g of m-phenylenediamine.

As specific procedures for the estimate, first, it was assumed that applied m-phenylenediamine of all the amount underwent interfacial polymerization based on the reaction formula (1). The amount of the cellulose nanofiber to the total amount of applied m-phenylenediamine was calculated from the ratio of the concentrations of m-phenylenediamine and the cellulose nanofiber in the second aqueous solution. Next, the proportion of unreacted m-phenylenediamine was obtained through an experiment, and m-phenylenediamine having actually underwent interfacial polymerization was calculated, and then the content of the cellulose nanofiber (mass %) was calculated. CSA did not affect the calculation of the content of the cellulose nanofiber since being dissolved and flowing out in measurement of the water permeation flux described later.

Specifically, the experiment in obtainment of unreacted m-phenylenediamine was carried out as follows using the second aqueous solution containing no cellulose nanofiber, and the second aqueous solution containing a 0.2 mass % cellulose nanofiber. When no cellulose nanofiber was contained, the second aqueous solution containing 2 mass % m-phenylenediamine, 0.15 mass % SLS, and 6 mass % IPA was applied to the porous support, an IP solvent solution containing 0.1 mass % trimesoyl chloride at room temperature was applied to cause interfacial polymerization, excessive part of the trimesoyl chloride solution was drained as much as possible, and the resultant was dried up at 120° C. for 5 minutes, to make a sample for measurement. When the cellulose nanofiber was contained, the sample was made in the same manner as the foregoing except that a 0.2 mass % cellulose nanofiber was added to the second aqueous solution.

The sample for measurement was punched out using a ring punch after dried up, and weighed using a precision balance. This was subjected to pressure washing by pure water and dried up, and thereafter weighed in the same manner as the foregoing. The difference between mass before the washing and mass after the washing was defined as a mass difference i. The mass difference i can be regarded as mass of a substance washed away by the washing by pure water. The aqueous solution applied to the porous support contained SLS and IPA, in addition to m-phenylenediamine. Here, IPA was assumed scattering in drying, and then mass of unreacted m-phenylenediamine was defined as mass a. Mass a was obtained through subtraction of mass corresponding to SLS from the mass difference i. Mass of SLS having remained in the semipermeable membrane was obtained from the mass ratio of m-phenylenediamine and SLS in the second aqueous solution (1:0.075), and the total amount of m-phenylenediamine applied to the porous support. The total amount of m-phenylenediamine was obtained from the sum of mass c (mass b in terms of m-phenylenediamine) described later, and the amount of unreacted m-phenylenediamine. Here, the amount of unreacted m-phenylenediamine was obtained as follows: first, it was assumed that the mass difference i showed mass of unreacted m-phenylenediamine; then the mass difference i was added to mass c, and the result was defined as the total amount of m-phenylenediamine $\alpha_1$; $\alpha_1$ was multiplied by 0.075, and the result was defined as SLS mass $\beta_1$; and SLS mass $\beta_1$ was subtracted from the mass difference i, and the result was defined as unreacted m-phenylenediamine $\alpha_2$.

Next, unreacted m-phenylenediamine $\alpha_2$ and mass c were added together, and the result was defined as the total amount of m-phenylenediamine $\alpha_3$. The total amount of m-phenylenediamine $\alpha_3$ was multiplied by 0.075, and then SLS mass $\beta_2$ was obtained. SLS mass $\beta_2$ was subtracted from the mass difference i, and the result was defined as unreacted m-phenylenediamine $\alpha_4$. The same calculation was repeated so that the value of unreacted m-phenylenediamine converged, and the result was defined as mass of unreacted m-phenylenediamine. The amount of unreacted trimesoyl chloride remaining in the sample for measurement was one order smaller than the amount of SLS, and thus could be ignored since the trimesic acid solution of a low concentration was used, and the trimesic acid solution after the interfacial polymerization was sufficiently drained.

$$\text{mass } a = \text{mass difference } i - \text{amount of applied } SLS \quad (2)$$

where mass a represents mass of unreacted m-phenylenediamine, mass difference i represents a difference between mass of the sample for measurement before the washing and mass thereof after the washing, and the amount of applied SLS represents mass of SLS corresponding to the total amount of applied m-phenylenediamine.

Next, this sample was immersed in chloroform for a short time to dissolve the porous support, and a polyamide membrane was taken out. This membrane was dried up at 150° C. and thereafter weighed. The result was defined as mass of the polyamide membrane b. Since 1 g of a polyamide was formed from 0.51 g of m-phenylenediamine, mass b was multiplied by 0.51, and the result was defined as mass c in terms of m-phenylenediamine (0.51×mass b). The proportion of unreacted m-phenylenediamine d was obtained by the following formula (3), and took almost the same value in each of Nos. 1 to 3 illustrating the experiment where no cellulose nanofiber was contained, and Nos. 4 to 6 illustrating the experiment where the cellulose nanofiber was contained. The mean value of these six cases was used for estimating the content of the cellulose nanofiber. Table 1 illustrates numeral values obtained through six experiments and calculations.

$$\text{Proportion } d = \text{mass } a/(\text{mass } a + \text{mass } c) \quad (3)$$

where proportion d represents the proportion of unreacted m-phenylenediamine, mass a represents mass of unreacted m-phenylenediamine, and mass c represents mass of the polyamide membrane b× 0.51.

The content of the cellulose nanofiber was obtained by the ratio of mass of the cellulose nanofiber to mass of the polyamide containing the cellulose nanofiber. It was assumed that the applied cellulose nanofiber did not deeply enter the porous support even if end portions thereof entered pores of the porous support, but all the amount thereof was present in the outermost layer, and that the thickness of the applied second aqueous solution was 15 μm. Then, mass of the cellulose nanofiber was calculated from the concentration of the cellulose nanofiber, and the result was defined as mass e.

Concerning mass of the formed polyamide, mass of the polyamide formed when applied m-phenylenediamine of all the amount underwent interfacial polymerization was defined as mass f, and mass of m-phenylenediamine when the thickness of the applied second aqueous solution was 15 μm was calculated from the concentration thereof. When mass of the actually formed polyamide was defined as mass h, mass h was smaller than mass f due to unreacted m-phenylenediamine. Since the total amount of applied m-phenylenediamine could be considered as the sum of mass a and mass c, mass h was obtained by the following formula (4).

$$\text{Mass } h = \text{mass } f \times (1 - \text{proportion } d) \quad (4)$$

where proportion d represents the proportion of unreacted m-phenylenediamine, mass f represents mass of the polyamide formed when applied m-phenylenediamine of all the amount underwent interfacial polymerization, and mass h represents mass of the actually formed polyamide.

The proportion d varied according to conditions for making the semipermeable membrane such as the concentration of m-phenylenediamine in the second aqueous solution, and the concentration of the cellulose nanofiber. Here, mass h was obtained assuming that the proportion d took a fixed value, 0.27. Using mass h, the content of the cellulose nanofiber in the semipermeable membrane (CNF content) (mass %) was obtained by the following formula (1).

$$CNF \text{ content (mass \%)} = \text{mass } e/(\text{mass } h + \text{mass } e) \times 100 \quad (1)$$

where CNF content represents the content of the cellulose nanofiber, mass e represents mass of the cellulose nanofiber, and mass h represents mass of the actually formed polyamide.

The content of the cellulose nanofiber in the semipermeable composite membrane according to Example 1 was 0.35 mass %.

TABLE 1

| No. | Before washing (mg) | After washing (mg) | Mass difference (mg) | Mass a In terms of MPD (mg) | Mass b Weight of membrane (mg) | Mass c In terms of MPD (mg) | Proportion d Proportion of unreacted MPD |
|---|---|---|---|---|---|---|---|
| 1 | 48.96 | 48.57 | 0.39 | 0.302 | 1.72 | 0.877 | 0.26 |
| 2 | 49.19 | 48.85 | 0.34 | 0.266 | 1.4 | 0.714 | 0.27 |
| 3 | 48.1 | 47.75 | 0.35 | 0.276 | 1.39 | 0.709 | 0.28 |
| 4 | 48.3 | 47.94 | 0.36 | 0.274 | 1.57 | 0.877 | 0.24 |
| 5 | 48.29 | 47.91 | 0.38 | 0.303 | 1.42 | 0.714 | 0.3 |
| 6 | 48.61 | 48.28 | 0.33 | 0.259 | 1.36 | 0.709 | 0.27 |
| | | | | mean | | | 0.27 |

*1: MPD in the table is an abbreviation of m-phenylenediamine.
*2: Mass a is mass of unreacted m-phenylenediamine.
*3: Proportion d is the proportion of mass a to the sum of mass a and mass c.

(2) Making Sample According to Example 2 (2.3 Mass % CNF)

A sample according to Example 2 was made in the same manner as in Example 1 except for the step of making the second aqueous solution as the foregoing (1-2), and except that the concentration of trimesoyl chloride was 0.25 mass %. In Example 2, a first aqueous solution was obtained by adding 50 g of distilled water to 9 g of m-phenylenediamine, and stirring and mixing the resultant using a magnetic stirrer. A second aqueous solution was obtained by stirring and mixing the obtained first aqueous solution and 50 g of an aqueous dispersion liquid having a concentration of a cellulose nanofiber of 0.6 mass % using a magnetic stirrer, adding an additive (0.45 g of SLS, 18 g of CSA, 9 g of TEA and 18 g of IPA) dissolved in 20 g of distilled water, adding distilled water so that the total amount was 300 g, and stirring the resultant using a magnetic stirrer. The second aqueous solution contained 3.0 mass % m-phenylenediamine, a 0.1 mass % a cellulose nanofiber, 0.15 mass % SLS, 6.0 mass % CSA, 3.0% TEA, and 6.0 mass % IPA. The mean fiber diameter of the cellulose nanofiber was 3 nm to 4 nm.

The content of the cellulose nanofiber in the sample according to Example 2 was estimated in the same way as in the foregoing (1-4). The content of the cellulose nanofiber in the semipermeable membrane according to Example 2 was 2.3 mass %.

(3) Making Sample According to Example 3 (3.4 Mass % CNF)

A sample according to Example 3 was made in the same manner as in Example 1 except for the step of making the second aqueous solution as the foregoing (1-2). The second aqueous solution in Example 3 was the same as in Example 1 except that the amount of the 0.6 mass % cellulose nanofiber was 50 g. This second aqueous solution contained 2.0 mass % m-phenylenediamine, a 0.1 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

The content of the cellulose nanofiber in the sample according to Example 3 was estimated in the same way as in the foregoing (1-4). The content of the cellulose nanofiber in the semipermeable membrane according to Example 3 was 3.4 mass %.

(4) Making Sample According to Example 4 (4.5 Mass % CNF)

A sample according to Example 4 was made in the same manner as in Example 1 except for the step of making the second aqueous solution as the foregoing (1-2), and except that the concentration of trimesoyl chloride was 0.25 mass %. The second aqueous solution in Example 4 was the same as in Example 2 except that the amount of the 0.6 mass % cellulose nanofiber was 100 g. This second aqueous solution contained 3.0 mass % m-phenylenediamine, a 0.2 mass % cellulose nanofiber, 0.15 mass % SLS, 6.0 mass % of CSA, 3.0% TEA, and 6.0 mass % IPA. The mean fiber diameter of the cellulose nanofiber was 3 nm to 4 nm.

The content of the cellulose nanofiber in the sample according to Example 4 was estimated in the same way as in the foregoing (1-4). The content of the cellulose nanofiber in the semipermeable membrane according to Example 4 was 4.5 mass %.

(5) Making Sample According to Example 5 (6.5 Mass % CNF)

A sample according to Example 5 was made in the same manner as in Example 1 except for the step of making the second aqueous solution as the foregoing (1-2). The second aqueous solution in Example 5 was the same as in Example 1 except that the amount of the 0.6 mass % cellulose nanofiber was 100 g. This second aqueous solution contained 2.0 mass % m-phenylenediamine, a 0.2 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

The content of the cellulose nanofiber in the sample according to Example 5 was estimated in the same way as in the foregoing (1-4). The content of the cellulose nanofiber in the semipermeable membrane according to Example 5 was 6.5 mass %.

(6) Making Sample According to Example 6 (10.1 Mass % CNF)

A sample according to Example 6 was made in the same manner as in Example 1 except for the step of making the second aqueous solution as the foregoing (1-2). In Example 6, a first aqueous solution was obtained by adding 30 g of distilled water to 7.5 g of m-phenylenediamine, and stirring and mixing the resultant using a magnetic stirrer. A second aqueous solution was obtained by stirring and mixing the obtained first aqueous solution and 200 g of an aqueous dispersion liquid having a concentration of a cellulose nanofiber of 0.6 mass % using a magnetic stirrer, adding an additive (same as in Example 1) dissolved in 20 g of distilled water, adding distilled water so that the total amount was 300 g, and stirring the resultant using a magnetic stirrer. The second aqueous solution contained 2.5 mass % m-phenylenediamine, a 0.4 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

The content of the cellulose nanofiber in the sample according to Example 6 was estimated in the same way as in the foregoing (1-4). The content of the cellulose nanofiber in the semipermeable membrane according to Example 6 was 10.1 mass %.

(7) Making Sample According to Example 7 (12.3 Mass % CNF)

A sample according to Example 7 was made in the same manner as in Example 1 except for the step of making the second aqueous solution as the foregoing (1-2). The second aqueous solution in Example 7 was the same as in Example 1 except that the amount of the 0.6 mass % cellulose nanofiber was 200 g. This second aqueous solution contained 2.0 mass % m-phenylenediamine, a 0.4 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

The content of the cellulose nanofiber in the sample according to Example 7 was estimated in the same way as in the foregoing (1-4). The content of the cellulose nanofiber in the semipermeable membrane according to Example 7 was 12.3 mass %.

(8) Making Sample According to Example 8 (14.4 Mass % CNF)

A sample according to Example 8 was made in the same manner as in Example 1 except for the step of making the second aqueous solution as the foregoing (1-2). The second aqueous solution in Example 8 was the same as in Example 6 except that the amount of the 0.9 mass % cellulose nanofiber was 200 g. This second aqueous solution contained 2.5 mass % m-phenylenediamine, a 0.6 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

The content of the cellulose nanofiber in the sample according to Example 8 was estimated in the same way as in the foregoing (1-4). The content of the cellulose nanofiber in the semipermeable membrane according to Example 8 was 14.4 mass %.

(9) Making Sample According to Example 9 (17.3 Mass % CNF)

A sample according to Example 9 was made in the same manner as in Example 1 except for the step of making the second aqueous solution as the foregoing (1-2). The second aqueous solution in Example 9 was the same as in Example 1 except that the amount of the 0.9 mass % cellulose nanofiber was 200 g. This second aqueous solution contained 2.0 mass % m-phenylenediamine, a 0.6 mass % cellulose nanofiber, 0.15 mass % SLS, 4.0 mass % CSA, 2.0% TEA, and 6.0 mass % IPA. The mean fiber diameter of the cellulose nanofiber was 3 nm to 4 nm.

The content of the cellulose nanofiber in the sample according to Example 9 was estimated in the same way as in the foregoing (1-4). The content of the cellulose nanofiber in the semipermeable membrane according to Example 9 was 17.3 mass %.

(10) Making Sample According to Comparative Example 1 (0 Mass % CNF)

As Comparative Example 1, a sample according to Comparative Example 1 which was a single polyamide produced by the second aqueous solution containing no cellulose nanofiber was obtained. The composition of the second aqueous solution was the same as that of the second aqueous solutions in Examples 2 and 4, and included 3.0 mass % m-phenylenediamine, 0.15 mass % SLS, 6.0 mass % CSA, 3.0% TEA, and 6.0 mass % IPA. The concentration of the trimesoyl chloride solution used for the interfacial polymerization was 0.25 mass %.

(11) Sample According to Comparative Example 2

A sample according to Comparative Example 2 was a commercially available crosslinked aromatic polyamide membrane, and contained no cellulose nanofiber.

(12) Measuring Permeation Flux and Salt Rejection Rate

Figure 2:
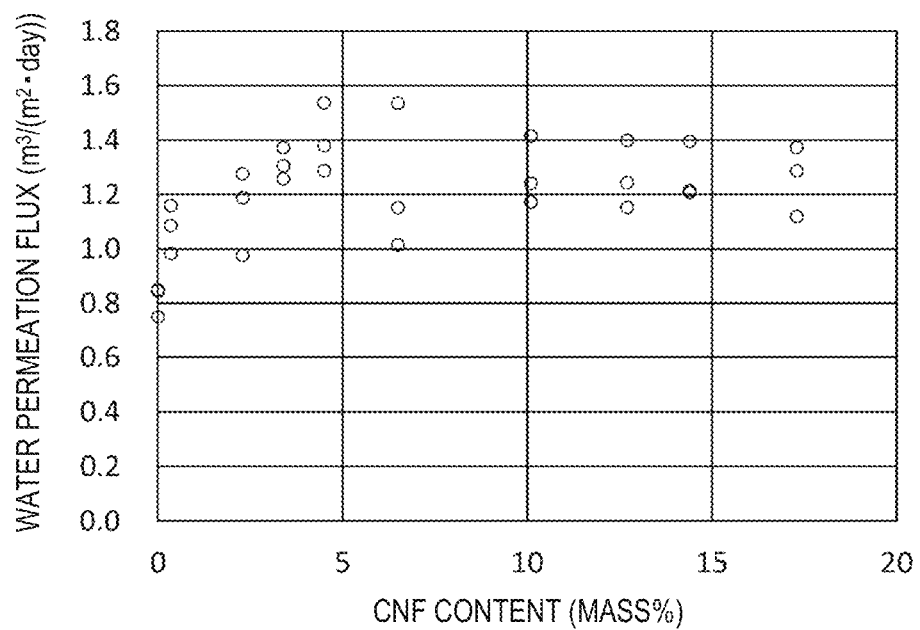
FIG. 2 is a chart of water permeation fluxes and contents of cellulose nanofibers.

The water permeation flux of the semipermeable composite membrane 100 was measured as follows. A test cell of the semipermeable composite membrane having a diameter of 25 mm (effective area: 3.46 cm$^2$) was installed in a membrane test unit, and pure water was fed at 5.5 MPa in operating pressure at 300 mL/min in flow rate for 3 hours, to stabilize the water permeation flux. Next, a 3.2 mass % sodium chloride aqueous solution at 25° C. was fed by the cross flow filtration method at 5.5 MPa in operating pressure at 300 mL/min in flow rate, and the water permeation flux was measured every ten minutes, to measure the water permeation flux after 30 minutes had passed from the start of feeding until 1 hour had passed therefrom. FIG. 2 illustrates the water permeation flux (m$^3$/(day m$^2$)) to the content of the cellulose nanofiber in the semipermeable membrane (CNF content (mass %)) according to each of Examples 1 to 9 and Comparative Example 1.

Figure 3:
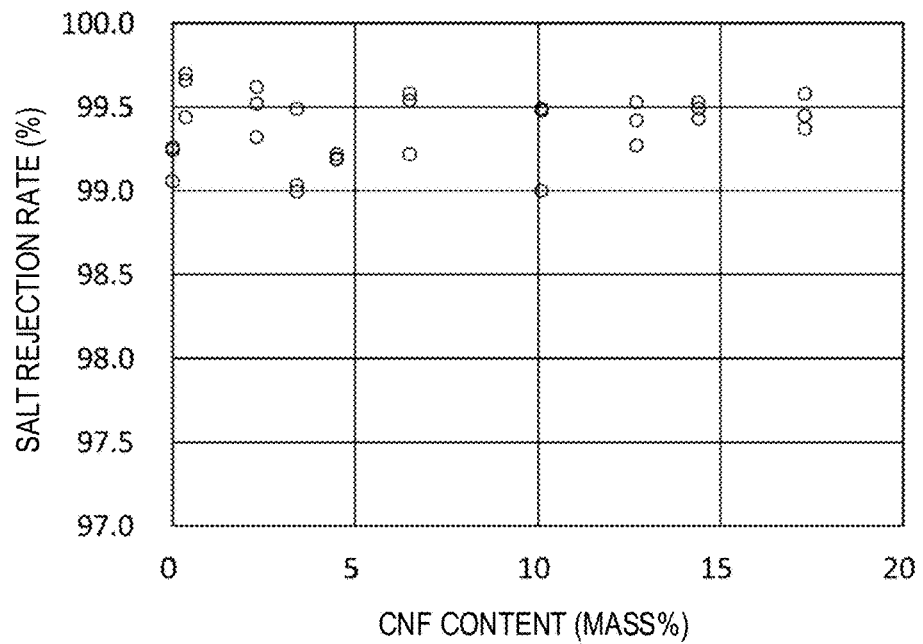
FIG. 3 is a chart of salt rejection rate and contents of cellulose nanofibers.

The salt rejection (NaCl rejection rate) when the water permeation flux was measured was measured together with the measurement of the water permeation flux. A value after passage of 1 hour since the start of feeding was employed for the salt rejection rate, with the electrical conductivity of a feed and a permeate being measured using an lectric conductivity meter (ES-71) manufactured by HORIBA, Ltd., and the salt rejection rate (%) was obtained by the following formula using the NaCl concentration obtained by converting the electrical conductivity. FIG. 3 illustrates the salt rejection rate (%) to the content of the cellulose nanofiber in the semipermeable membrane (CNF content (mass %)).

Salt rejection rate (%)=100×{1−(NaCl concentration in permeate/NaCl concentration in feed)}    (5)

As illustrated in FIG. 2, the water permeation flux of the sample according to Comparative Example 1 was 0.75 $m^3/(m^2 \cdot day)$ to 0.85 $m^3/(m^2 \cdot day)$ while the water permeation fluxes of the samples according to Examples 1 to 9 were 0.98 $m^3/(m^2 \cdot day)$ to 1.54 $m^3/(m^2 \cdot day)$. As illustrated in FIG. 3, the samples according to Examples 1 to 9 had a salt rejection rate of 99.0% or more, which was approximately the same as the sample according to Comparative Example 1.

(13) Measuring Anti-Organic Fouling Properties

Using a desktop flat membrane test unit FTU-1 from Membrane Soltech, a 10 mmol sodium chloride aqueous solution containing 100 ppm bovine serum albumin (BSA) at 23° C. was fed to the semipermeable composite membrane at 0.7 MPa in operating pressure at 500 mL/min in flow rate, and then the amount (g) of a permeate per hour was measured. This amount of a permeate was converted to the amount (cubic meter) of a permeate per square meter on the face of the membrane per day, and the result was defined as the water permeation flux ($m^3/(m^2 \cdot day)$). The water permeation flux ($m^3/(m^2 \cdot day)$) obtained from the amount (g) of a permeate from the start of feeding until 1 hour had passed since the start was defined as the initial water permeation flux.

Figure 4:
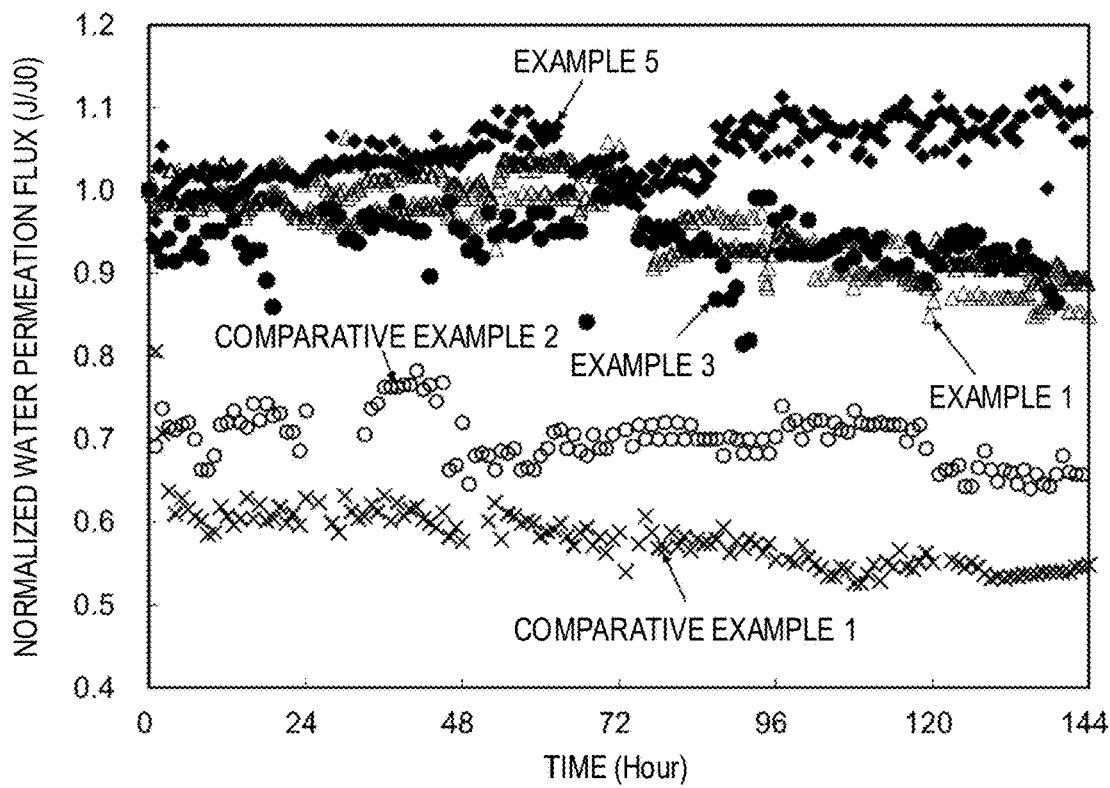
FIG. 4 is a chart illustrating change in the water permeation flux in being in contact with a 100 ppm bovine serum albumin aqueous solution for 140 hours.

Based on the measurement results of anti-organic fouling properties, FIG. 4 illustrates the chart of the water permeation flux representing anti-organic fouling properties of the samples according to Examples 1, 3 and 5 and Comparative Examples 1 and 2 together. In FIG. 4, the vertical axis shows the water permeation flux after water to be treated which contained organic foulants was fed, which was standardized assuming that the initial water permeation flux was 1.0 (100%), and the horizontal axis shows time when the water to be treated was fed. The normalized water permeation flux in the vertical axis which corresponds to the horizontal axis 0 hr is 1.0.

As illustrated in FIG. 4, while the sample according to Comparative Example 1 shows a water permeation flux that is approximately 60% of the initial water permeation flux, and the sample according to Comparative Example 2 shows a water permeation flux that is approximately 70% of the initial water permeation flux, the water permeation flux as to the sample according to Example 3 is kept 80% or more of the initial water permeation flux, and no deterioration is observed as to Example 5. The high water permeation fluxes of the samples according to Examples 1, 3 and 5 were due to reduced lowering of the water permeation fluxes since organic foulants adhering to the surfaces of the semipermeable membranes just after the water to be treated which contained organic foulants was fed were released from the surfaces to flow down as time had passed.

(14) Electron Microscopic Observation

Figure 5:
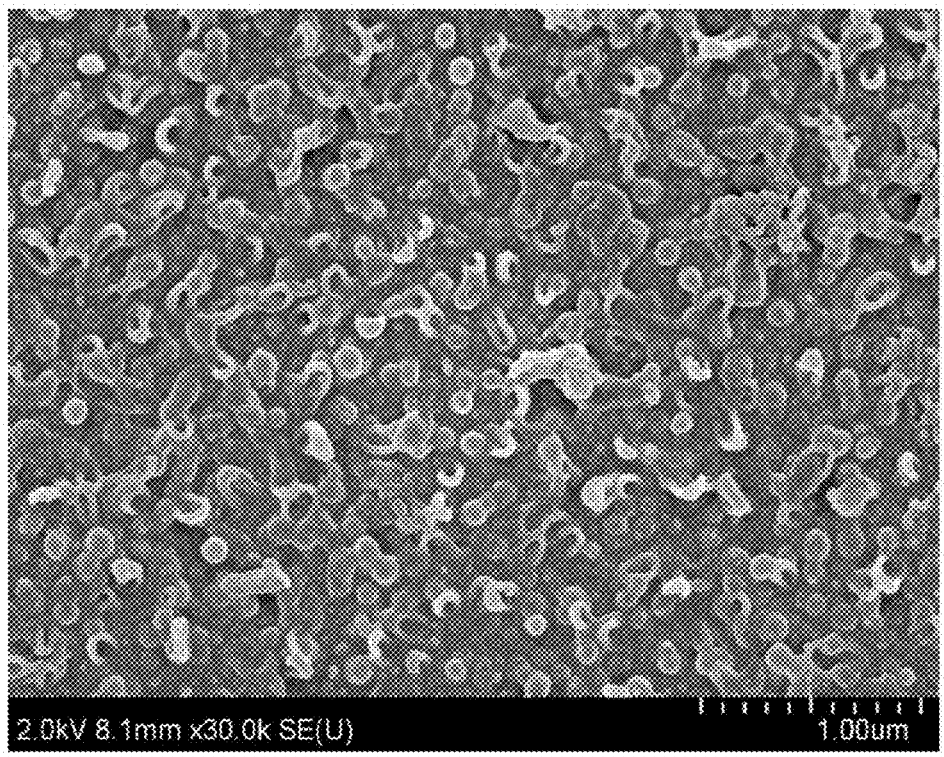
FIG. 5 is a photograph of a surface of a semipermeable composite membrane according to Comparative Example 1 by a scanning electron microscope.
Figure 6:
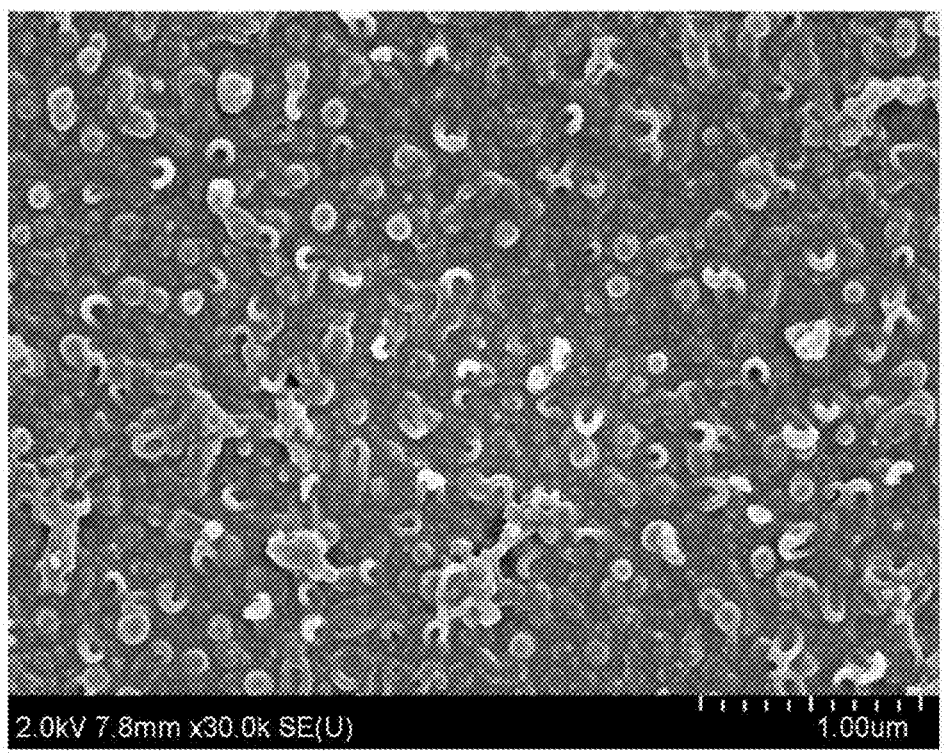
FIG. 6 is a photograph of a surface of a semipermeable composite membrane according to Example 2 by a scanning electron microscope.
Figure 7:
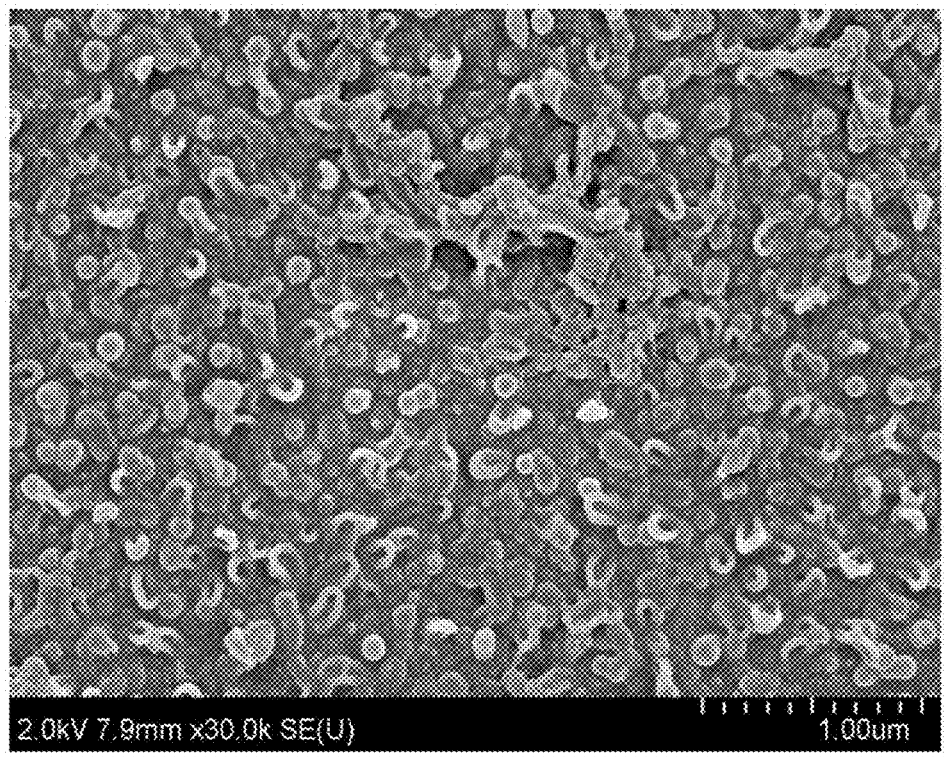
FIG. 7 is a photograph of a surface of a semipermeable composite membrane according to Example 4 by a scanning electron microscope.
Figure 8:
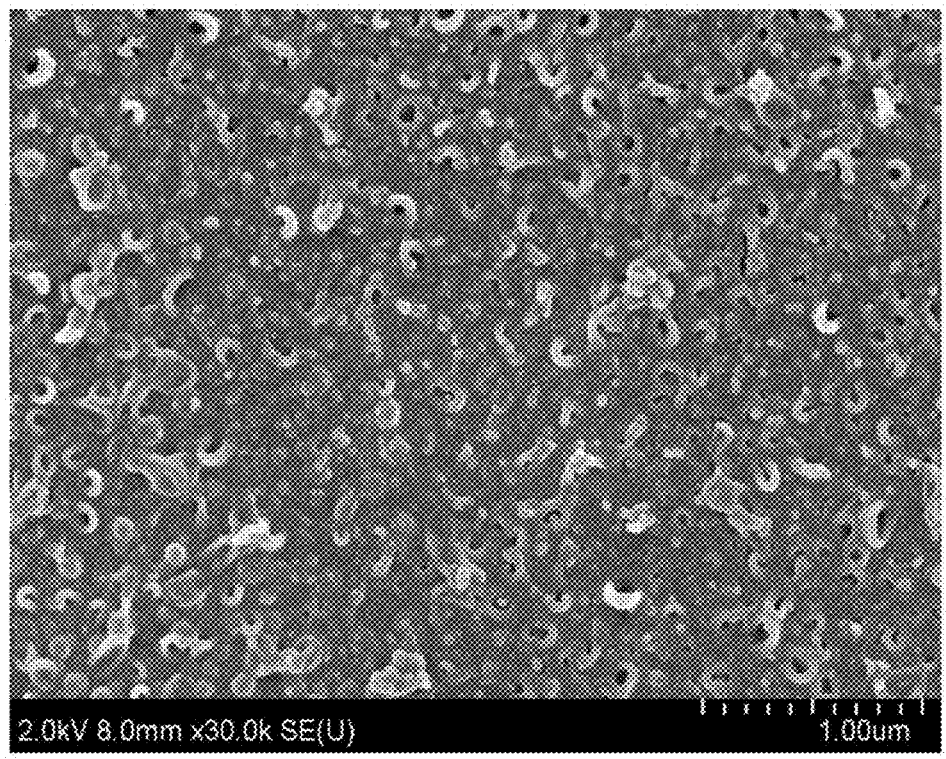
FIG. 8 is a photograph of a surface of a semipermeable composite membrane according to Example 6 by a scanning electron microscope.
Figure 9:
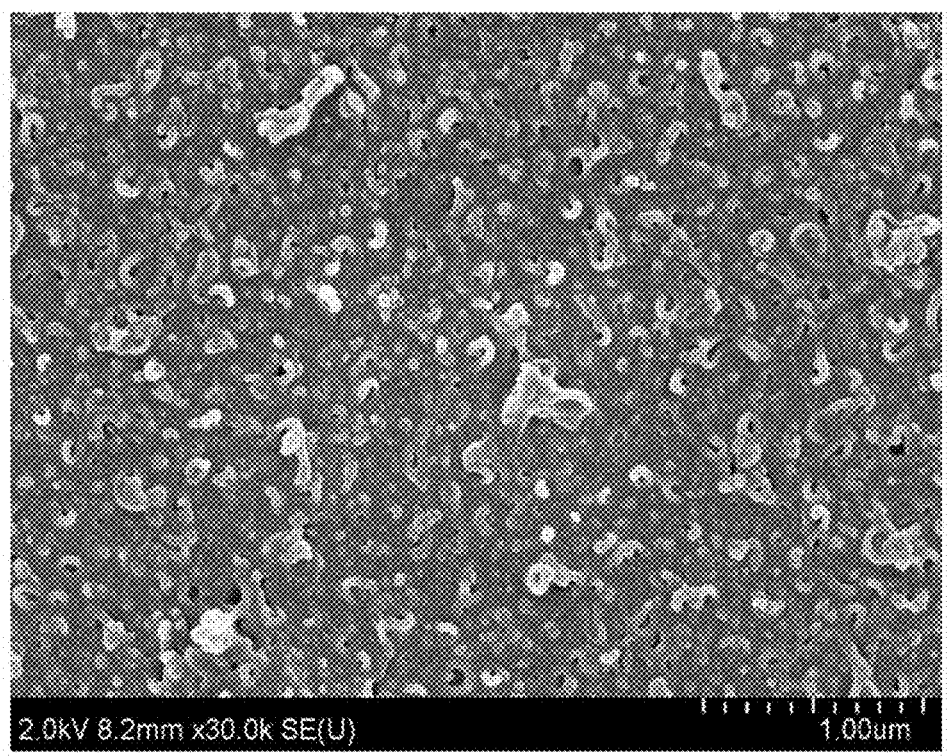
FIG. 9 is a photograph of a surface of a semipermeable composite membrane according to Example 7 by a scanning electron microscope.

FIG. 5 is a photograph of the surface of the semipermeable composite membrane (semipermeable membrane) according to Comparative Example 1 by a scanning electron microscope. FIGS. 6 to 9 are photographs of the surfaces of the semipermeable composite membranes (semipermeable membranes) according to Examples 2, 4, 6 and 7 respectively by a scanning electron microscope. The surface of the semipermeable composite membrane was covered with the semipermeable membrane in every sample. No exposure of the cellulose nanofiber to the surface of the semipermeable membrane was confirmed in the sample in each of FIGS. 6 to 9. According to FIGS. 5 to 9, the surface of the sample according to each of Examples 2, 4, 6 and 7 had less roughness than that according to Comparative Example 1, and was a comparatively smooth surface.

(15) Measuring Arithmetical Mean Height (Sa)

Figure 10:
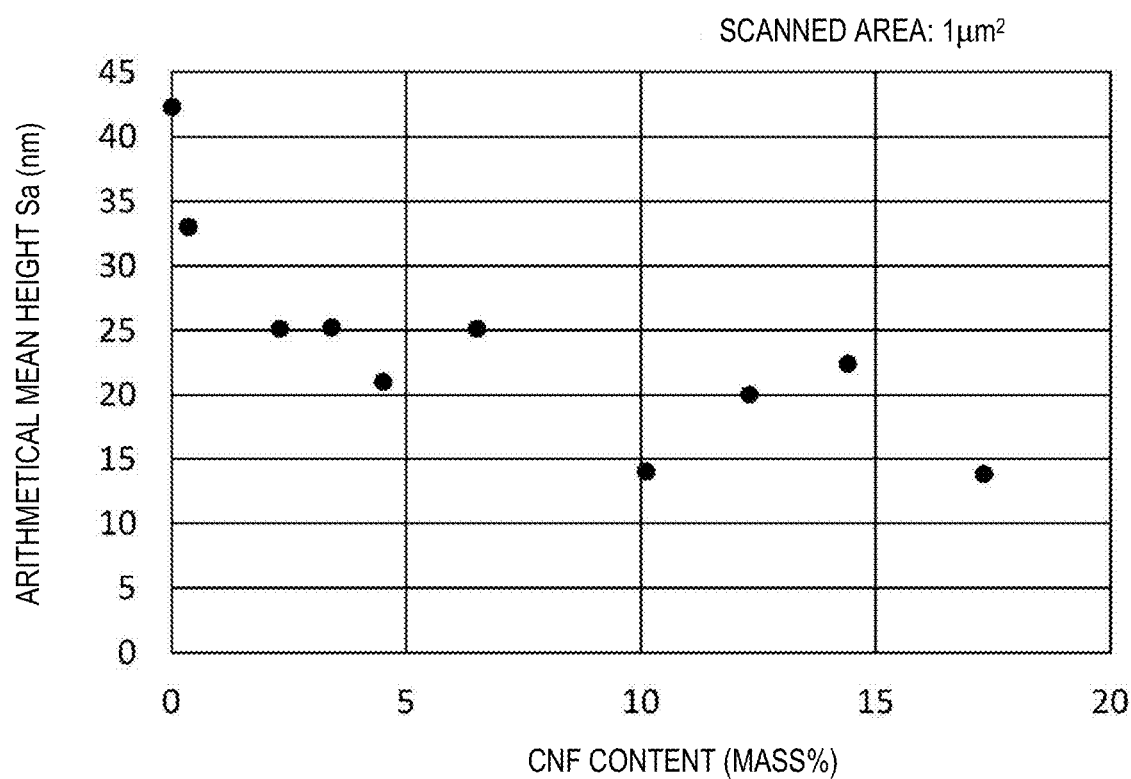
FIG. 10 is a chart of arithmetical mean heights (Sa) and contents of cellulose nanofibers.

The arithmetical mean height (Sa) of the surface of the semipermeable membrane of the sample of each of Comparative Examples 1 and 2 and Examples 1 to 9 was measured using an atomic force microscope 5500AFM/SPM (manufactured by Agilent Technologies, Inc./TOYO Corporation): the arithmetical mean height (Sa) conformed to ISO 25178, and was obtained by expanding the arithmetic mean roughness Ra (two-dimension) conforming to JIS B 0601-2013 to a 3D surface texture parameter. The measurement conditions were: single crystal Si cantilever (product name: FRM, manufactured by NANO WORLD, material: single crystal Si, probe length: 225 nm, tip radius: 8 nm), spring constant: 5.0 N/m, scanning mode: AC mode, and scanned range: 1 μm×1 μm. Table 2 and FIG. 10 illustrate the measurement results.

TABLE 2

|  | CNF content (mass %) | Arithmetical mean height Sa (nm) |
|---|---|---|
| Example 1 | 0.35 | 33.0 |
| Example 2 | 2.3 | 25.1 |
| Example 3 | 3.4 | 25.2 |
| Example 4 | 4.5 | 21.0 |
| Example 5 | 6.5 | 25.1 |
| Example 6 | 10.1 | 14.0 |
| Example 7 | 12.3 | 20.0 |
| Example 8 | 14.4 | 22.4 |
| Example 9 | 17.3 | 13.8 |
| Comparative Example 1 | 0 | 42.3 |
| Comparative Example 2 | — | 52.5 |

As illustrated in Table 2, while the arithmetical mean heights (Sa) of the surfaces of the semipermeable membranes of the samples according to Comparative Examples 1 and 2 were 42.3 nm and 52.5 nm respectively, which means much unevenness and roughness, those of the samples according to Examples 1 to 9 were 13.8 nm to 33.0 nm, particularly those of the samples according to Examples 2 to 9, which contained 2.3 mass % CNF or more, were 25.2 nm or less, which mean that the surfaces of the semipermeable membranes were smooth. This improvement in smoothness made it easy for foulants adhering to the semipermeable membranes to be released, to recover the water permeation fluxes, which were lowered due to fouling of the semipermeable membranes, as time had passed.

REFERENCE SIGNS LIST

1 Raw water
2 Permeate
3 Concentrate
6 Perforated water collection tube
10 Spiral-type element
11 Envelope membrane
31 Permeate side flow path member
32 Feeding side flow path member
81 Outer casing
92 Perforated end plate 100 Semipermeable composite membrane
102 Porous support
104 Semipermeable membrane
105 Surface
110 Cellulose nanofiber
120 Crosslinked aromatic polyamide

The invention claimed is:

1. A semipermeable composite membrane for selectively separating a liquid mixture, the membrane comprising:
a porous support; and
a semipermeable membrane formed on the porous support, the semipermeable membrane containing a cross-linked polyamide and a cellulose nanofiber, a mean fiber diameter of the cellulose nanofiber being 3 nm to 4 nm,
wherein the cellulose nanofiber is fibrillated and dispersed over the entire semipermeable composite membrane including a surface of the semipermeable membrane;
the semipermeable membrane containing 2.3 mass % cellulose nanofiber or more and 18 mass % cellulose nanofiber or less; and
adjacent gaps in the fibrillated cellulose nanofiber being filled with the crosslinked aromatic polyamide.

2. The semipermeable composite membrane according to claim 1, wherein a rate of lowering a water permeation flux thereof after contacting with an aqueous solution for 140 hours is lower than 20%, the aqueous solution containing bovine serum albumin having a concentration of 100 ppm.

3. The semipermeable composite membrane according to claim 1, wherein an arithmetical mean height (Sa) of a surface of the semipermeable membrane is 10 nm to 37 nm, the arithmetical mean height being measured using an atomic force microscope conforming to ISO 25178.

4. The semipermeable composite membrane according to claim 1, wherein a water permeation flux thereof when a NaCl aqueous solution of pH 6 to 8 at 25° C. at 3.2% in concentration is fed at 5.5 MPa in operating pressure for 1 hour is 0.9 m$^3$/(m$^2$·day) or more, and a NaCl rejection rate thereof is 99% or more.

5. A method of producing a semipermeable composite membrane for selectively separating a liquid mixture, the method comprising:
obtaining a mixed solution containing a cellulose nanofiber, water, and an amine component; and
obtaining a semipermeable composite membrane by making the mixed solution be in contact with a porous support, thereafter, causing a cross-linking reaction of the amine component in the mixed solution, with the amine component adhering to the porous support,
wherein a mean fiber diameter of the cellulose nanofiber being 3 nm to 4 nm,
the cellulose nanofiber is fibrillated and dispersed over the entire semipermeable composite membrane including a surface of the semipermeable membrane;
the semipermeable membrane containing 2.3 mass % cellulose nanofiber or more and 18 mass % cellulose nanofiber or less; and
adjacent gaps in the fibrillated cellulose nanofiber being filled with the crosslinked aromatic polyamide.

6. A semipermeable composite membrane element comprising:
at least two of the semipermeable composite membranes according to claim 1, the semipermeable composite membranes being layered so that faces thereof on the semipermeable membrane sides face each other, and faces thereof on opposite sides to the semipermeable membrane sides face each other;
a raw water side flow path member disposed between the faces of the semipermeable composite membranes on the semipermeable membrane sides, the raw water side flow path member having a thickness of 0.15 mm to 0.9 mm;
a permeate side flow path member disposed between the faces of the semipermeable composite membranes on the opposite sides to the semipermeable membranes; and
a perforated water collection tube allowing a permeate, which flows in a permeate side flow path formed of the permeate side flow path member, to be collected.

7. The semipermeable composite membrane according to claim 1, wherein the semipermeable composite membrane is obtained by:
making a mixed solution containing a cellulose nanofiber, water, and an amine component be in contact with the porous support; and then
causing a cross-linked reaction of the amino component in the mixed solution, with the amino component adhering to the porous support.

* * * * *